(12) United States Patent
Ho et al.

(10) Patent No.: US 7,586,751 B2
(45) Date of Patent: Sep. 8, 2009

(54) FRAME OF OPTICAL DISPLAY

(75) Inventors: Shu-Wei Ho, Taichung (TW); Ying-Chi Wang, Kaohsiung County (TW)

(73) Assignee: Wintek Corporation, Taichung (TW)

( * ) Notice: Subject to any disclaimer, the term of this patent is extended or adjusted under 35 U.S.C. 154(b) by 672 days.

(21) Appl. No.: 11/079,100

(22) Filed: Mar. 15, 2005

(65) Prior Publication Data

US 2006/0166524 A1   Jul. 27, 2006

(51) Int. Cl.
*H05K 5/00* (2006.01)
(52) U.S. Cl. .................. 361/752; 361/807; 361/810
(58) Field of Classification Search .............. 361/829, 361/725, 716, 749, 681, 682
See application file for complete search history.

(56) References Cited

U.S. PATENT DOCUMENTS

| | | | |
|---|---|---|---|
| 5,838,412 A * | 11/1998 | Ueda et al. | 349/150 |
| 6,411,353 B1 * | 6/2002 | Yarita et al. | 349/59 |
| 7,075,794 B2 * | 7/2006 | Gall et al. | 361/749 |
| 7,109,575 B2 * | 9/2006 | Kang et al. | 257/685 |

* cited by examiner

*Primary Examiner*—Hung S Bui
(74) *Attorney, Agent, or Firm*—Bacon & Thomas PLLC (57) ABSTRACT

An optical display has a display panel, a circuit board, a flexible circuit board, a frame member and a barrier arm. The flexible circuit board has opposite end electrically connected to the display panel and the circuit board respectively. The display panel and the circuit board are installed in the frame member. The barrier arm is bonded to the frame member to have a space therebetween, in which the flexible circuit board is received to be protected.

19 Claims, 9 Drawing Sheets

FRAME OF OPTICAL DISPLAY

BACKGROUND OF THE INVENTION

1. Field of the Invention

The present invention relates generally to an optical display with the flexible printed circuit board, and more particularly to a frame of the optical display to protect the flexible printed circuit board from damage in the assembly process.

2. Description of the Related Art

Figure 1:
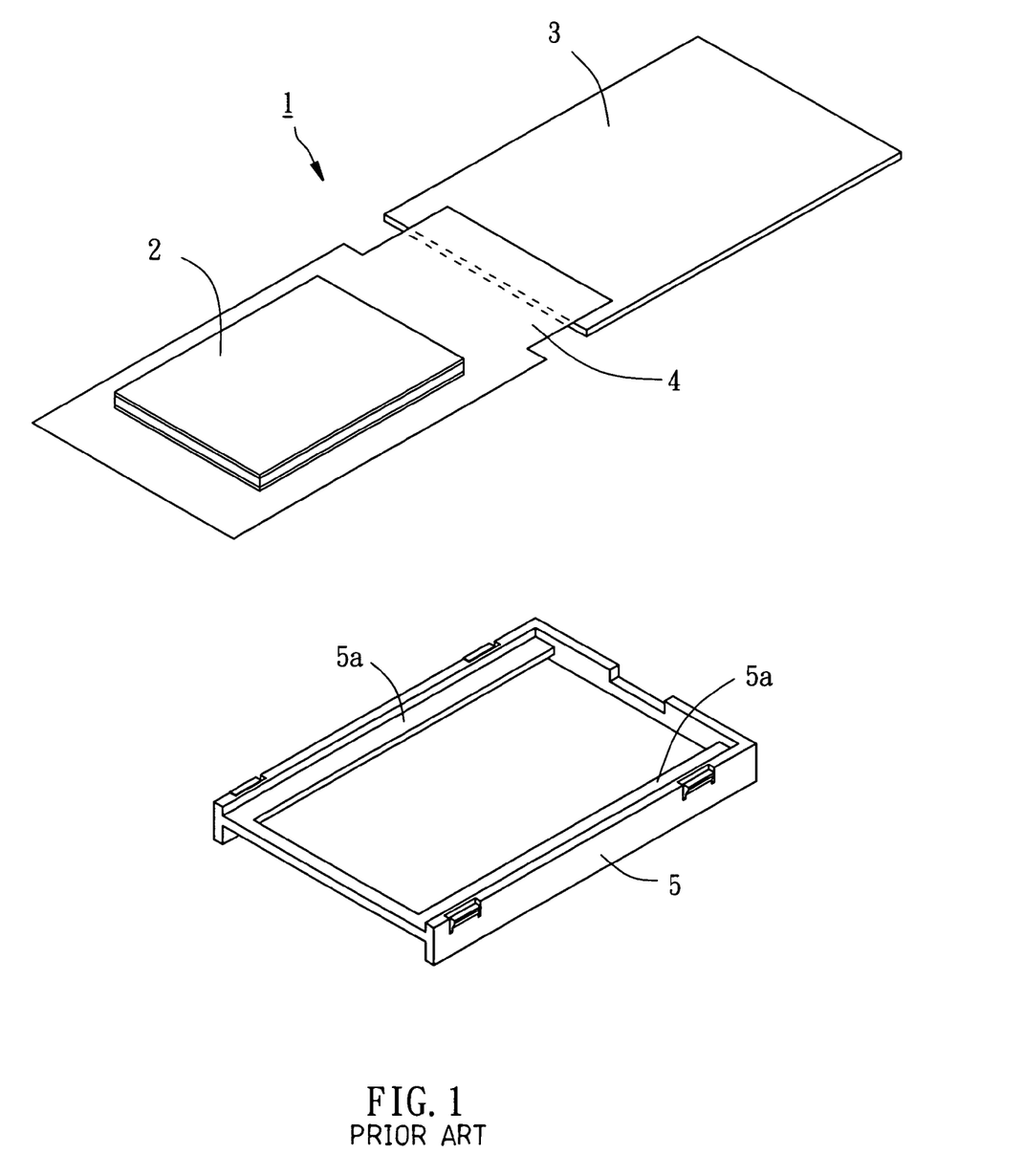
FIG. 1 is an exploded view of the conventional optical display.
Figure 2:
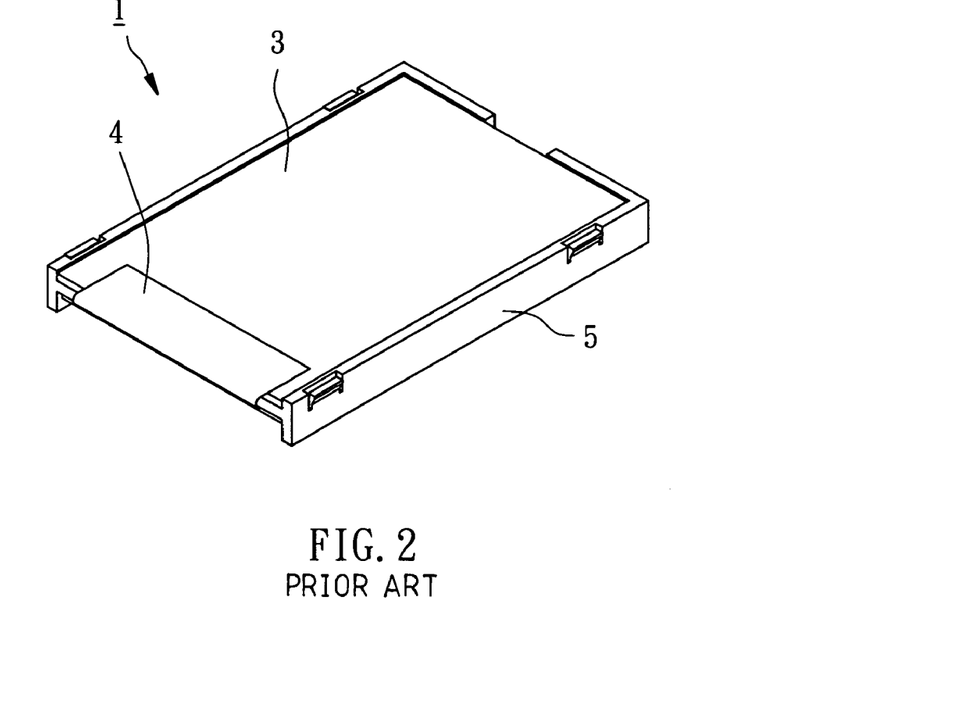
FIG. 2 is a perspective view of the conventional optical display.

As shown in FIG. 1 and FIG. 2, a conventional optical display 1 has a liquid crystal panel 2, a printed circuit board (PCB) 3, a flexible circuit board (FCB) 4 and a frame 5. The FCB 4 has two opposite ends electrically connected to the liquid crystal panel 2 and the PCB 3 respectively. The frame is made of plastic having two plates 5a at an inner side thereof.

The frame 5 is installed with both of the liquid crystal panel 2 and the PCB 3 and the plates 5a are extended between the liquid crystal panel 2 and the PCB 3. The FCB 4 is exposed out of the frame 5. The frame 5 protects the liquid crystal panel 2 and the PCB 3 but the FCB 4 has a risk to be damaged in the following assembly process. The break of the FCB causes a failure electrical connection between the liquid crystal panel 2 and the PCB 3. That is the main reason why the conventional optical display 1 has a great ratio of defective in fabrication.

SUMMARY OF THE INVENTION

The primary objective of the present invention is to provide an optical display, which the frame protects the flexible circuit board also to prevent it from damage.

According to the objective of the present invention, a frame of an optical display, which the optical display has a flexible circuit board, comprises a frame member, and a barrier arm connected to the frame to have a space between the frame member and the barrier arm. The flexible circuit board is received in the space.

DETAILED DESCRIPTION OF THE INVENTION

Figure 3:
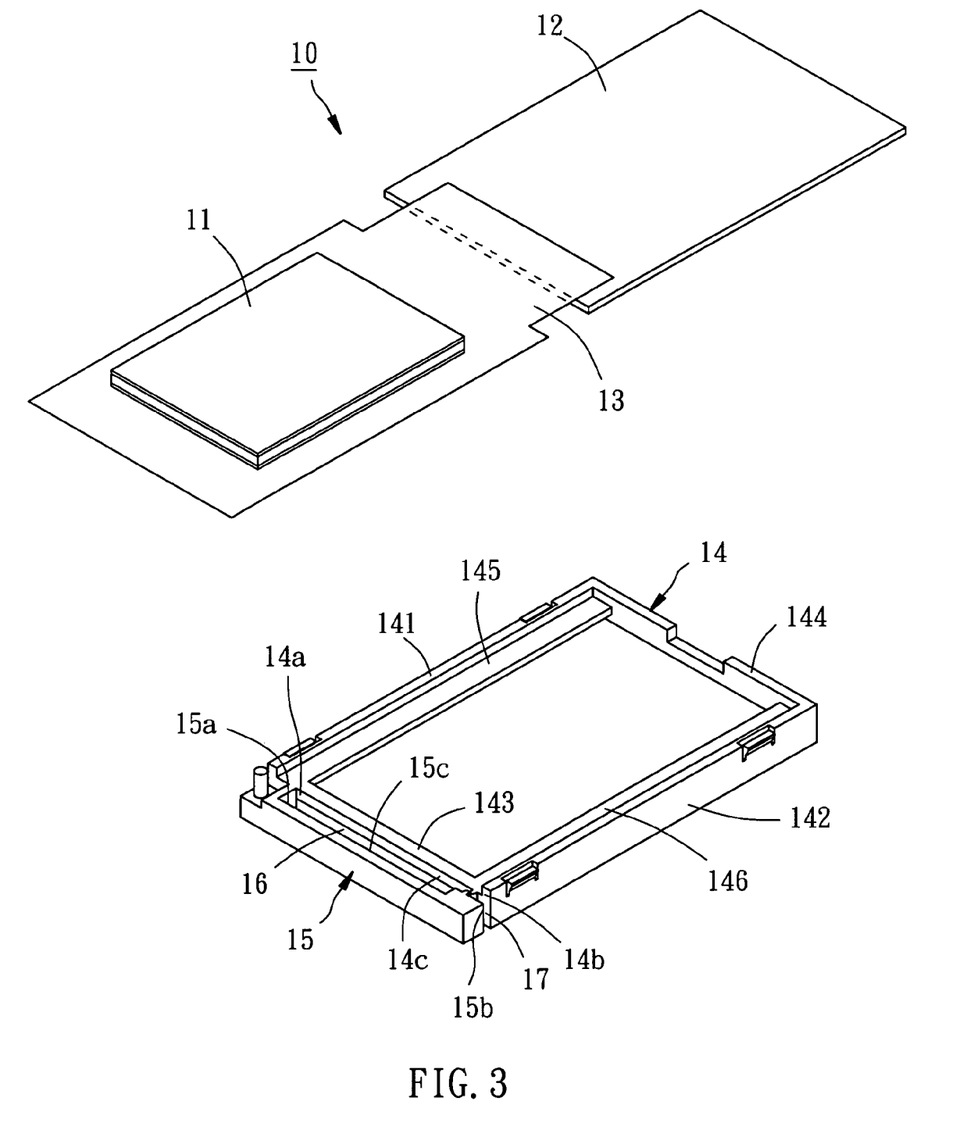
FIG. 3 is an exploded view of a first preferred embodiment of the present invention.

As shown in FIG. 3, an optical display 10 of the first preferred embodiment of the present invention comprises a display panel 11, a circuit board 12, a flexible circuit board 13 and a frame. The frame includes a frame member 14 and a barrier arm 15.

The flexible circuit board 13 has two opposite ends electrically connected to the display panel 11 and the circuit board 12 respectively.

The frame member 13 is made of plastic, as shown in FIG. 3, having two long sides 141, 142, two short sides 143, 144 and two plates 145, 146 projected inwardly from the long sides 141, 142 respectively. The frame 14 also has a first end 14a, a second end 14b and a first surface 14c between the first and second ends 14a and 14b.

The barrier arm 15 is made of plastic also with a length substantially equal to a length of the short side 143. The barrier arm 15 has a connecting end 15a, a free end 15b and a second surface 15c between the connecting end 15a and the free end 15b. As shown in FIG. 3, the barrier arm 15 is provided outside of the short side 143 with the second surface 15c thereof facing the first surface 14c of the frame member 14 that a narrow space 16 is left between the first surface 14c and the second surface 15c. The connecting end 15a of the barrier arm 15 is bonded to the first end 14a of the frame 14, in other words, the barrier arm 15 is projected from the frame 14 with the free end 15b thereof proximal to the second end 14b. The free end 15b of the barrier arm 15 is not in connection with the second end 14b of the frame 14, such that the barrier arm 15 is elastic and the free end 15b thereof is able to be swung to slightly touch the second end 14b or keep a distance from the second end 14b. In the present embodiment, there is a gap between the free end 15b and the second end 14b to the space 16.

In assembly, the free end 15b of the barrier arm 15 is exerted to enlarge the gap 17, and then the flexible circuit board 13 is inserted into the space 16 via the gap 17. While release the barrier arm 15, the free end 15b moves back automatically to narrow the gap 17, such that the flexible circuit board 13 is restricted in the space 16. Next, to install the display panel 11 and the circuit board 12 in the frame 14 firmly with the plate 145 and 146 separate the display panel 11 from the circuit board 12.

Figure 4:
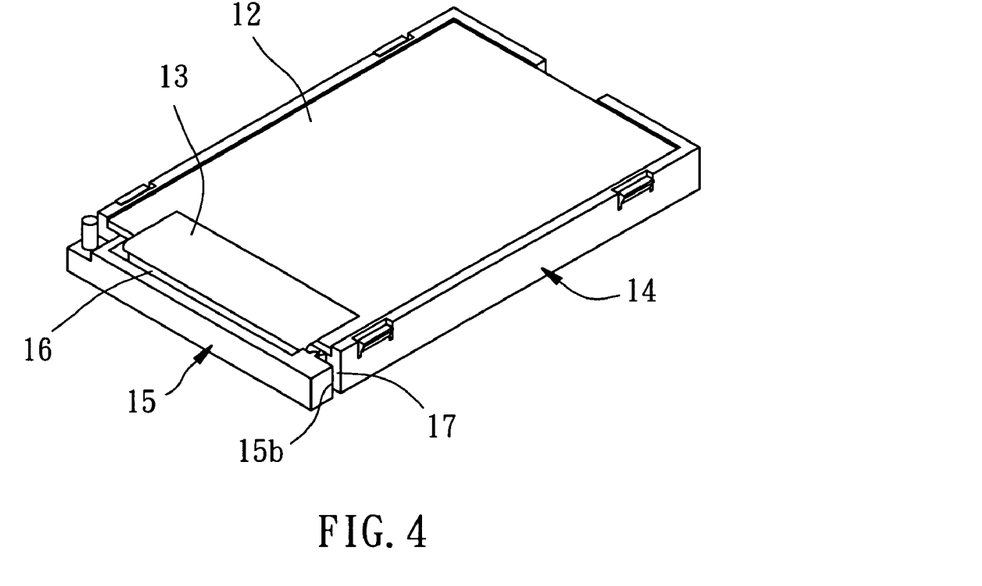
FIG. 4 is a perspective view of the first preferred embodiment of the present invention.

As shown in FIG. 4, the frame 14 of the present invention installs the display panel 11 and the circuit board 12 therein to protect them, and furthermore, the barrier arm 15 surround the flexible circuit board 13 for protection as well. Such that the flexible circuit board 13 has less risk to be damaged in the following assembly process.

Figure 5:
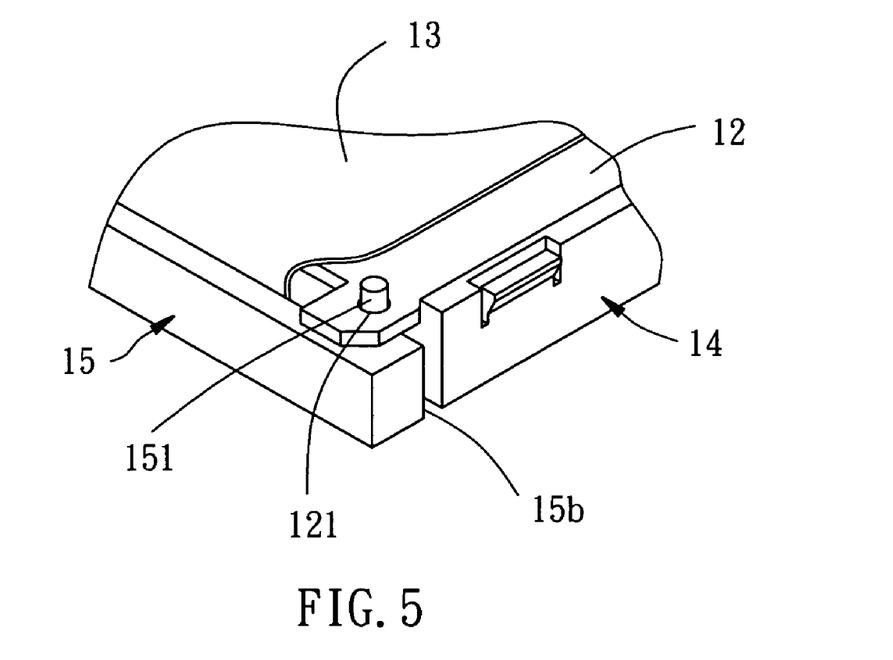
FIG. 5 is a perspective view in part of a second preferred embodiment of the present invention.
Figure 6:
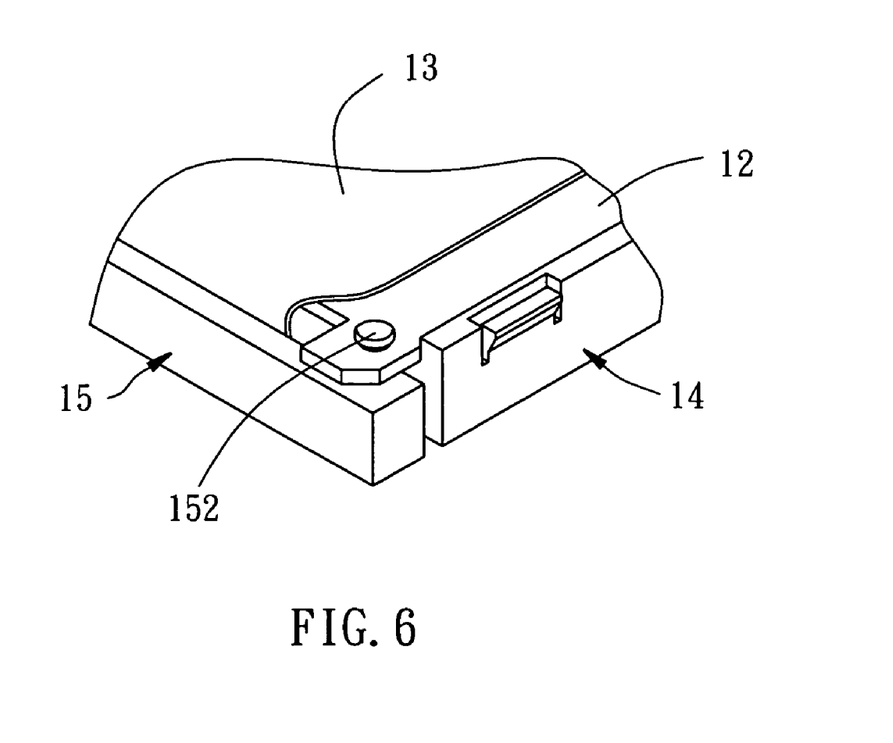
FIG. 6 is similar to FIG. 5, showing the fixing pin with a flat top.
Figure 7:
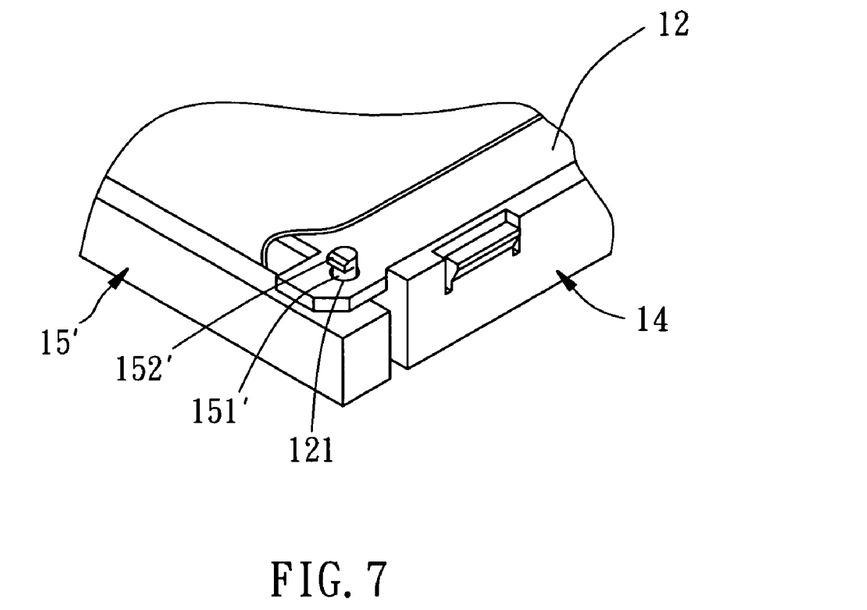
FIG. 7 is similar to FIG. 6, showing the fixing pin with a hook top.

As shown in FIG. 5, the second preferred embodiment of the present invention provides the circuit board 12 with a positioning portion at a corner thereof. The barrier arm 15 has a linking portion projected from a predetermined position thereof adjacent to the free end 15b. The positioning portion is a through hole 12 and the linking portion is a fixing pin 151 to be inserted into the through hole 121 while the circuit board 12 is installed in the frame 14. After that, the fixing pin 152 is heated and pressed to have a head with a diameter greater than a diameter of the through hole 121. As a result, referring to FIG. 6, the circuit board 12 is bonded to the barrier arm 15 firmly, and the barrier arm 15 is unable to be swung because of the circuit board 12. FIG. 7 shows an alternated design, which a barrier arm 15' has a fixing pin 151' with a hook-like head 152'. The head 152' is greater than the through hole 121, such that the fixing pin 151 is exerted to extrude the head 152' out of the through hole 121 to restrict the fixing pin 151'.

Figure 8:
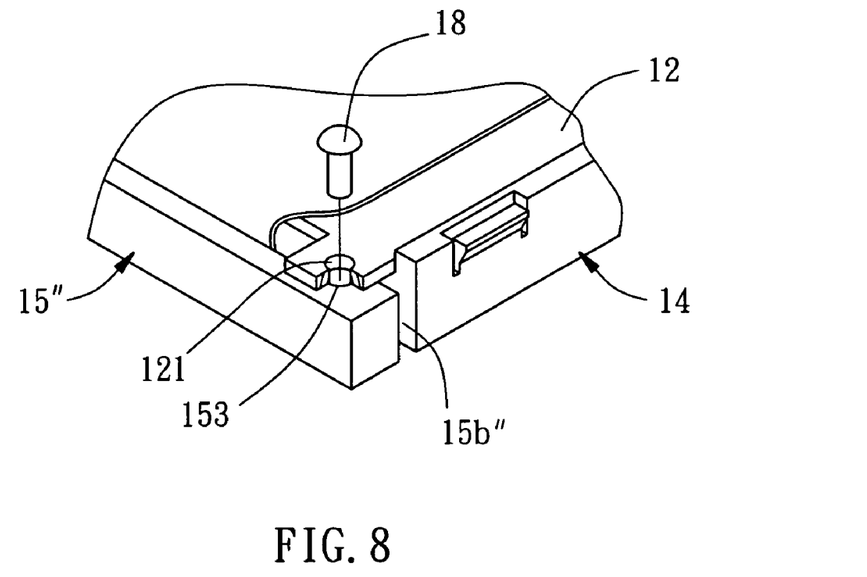
FIG. 8 is similar to FIG. 6, showing the fixing pin fixing the circuit board and the barrier arm.

As shown in FIG. 8, the embodiment provides a fixing member 18. The circuit board 12 has the through hole 121 at a corner thereof and the barrier arm 15" is provided with a fixing hole 153 adjacent to the free end 15b". The fixing member 18 is inserted into both of the fixing hole 153 of the barrier arm 15" and the through hole 121 of the circuit board 12 to fix the barrier arm 15" and the circuit board 12. It serves the same function as the embodiments described, The described embodiments provides the ways of bonding the barrier arm 15, 15' or 15" to the circuit board 12 that the barrier arm 15, 15' or 15" is restricted from being swung. There still are some way to achieve the same function and they are described hereunder.

Figure 9:
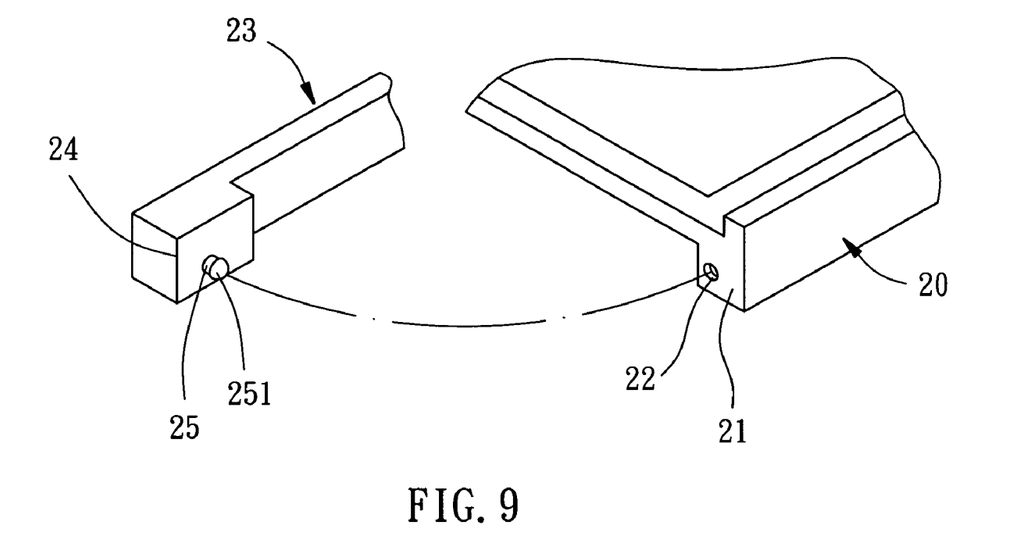
FIG. 9 is a perspective view in part of the present invention, showing the fixing pin mated with the through hole to connect the barrier arm to the frame.

As shown in FIG. 9, a frame member 20 is provided with a connecting portion adjacent to a second end 21 thereof, which is a through hole 22 in the present embodiment, and a barrier arm 23 is provided with a bonding portion adjacent to a free end 24 thereof, which is a fixing pin 25 having a head 251 with a diameter greater than a diameter of the through hole 22. While a flexible circuit board (not shown) is installed, the fixing pin 25 is exerted to have the head extruded out of the through hole 22. This embodiment has the same function as above.

Figure 10:
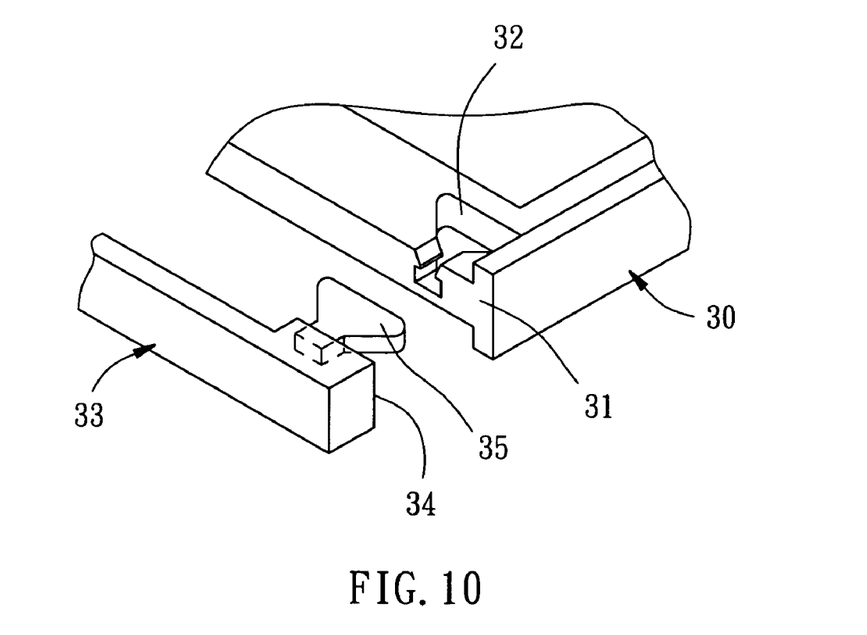
FIG. 10 is similar to FIG. 9, showing the lock block and the lock slot to connect the barrier arm to the frame.

As shown in FIG. 10, a frame member 30 is provided with a connecting portion adjacent to a second end 31 thereof, which is a lock slot 32 in the present embodiment, and a barrier arm 33 has a bonding portion adjacent to a free end 34 thereof, which is a lock block 35 in the present embodiment. The lock block 35 is engaged with the lock slot 34 to restrict the barrier arm 33.

Figure 11:
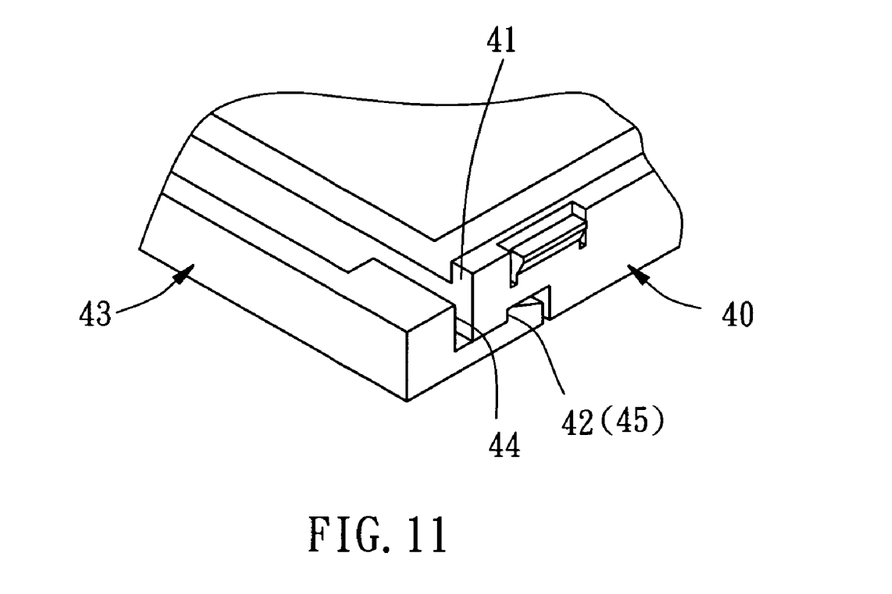
FIG. 11 is similar to FIG. 9, showing the hook to connect the barrier arm to the frame.

As shown in FIG. 11, a frame member 40 has a concave portion 42 adjacent to a second end 41 thereof, and a barrier arm has a lock hook 45 adjacent to a free end thereof to be hooked with the concave portion 42.

Figure 12:
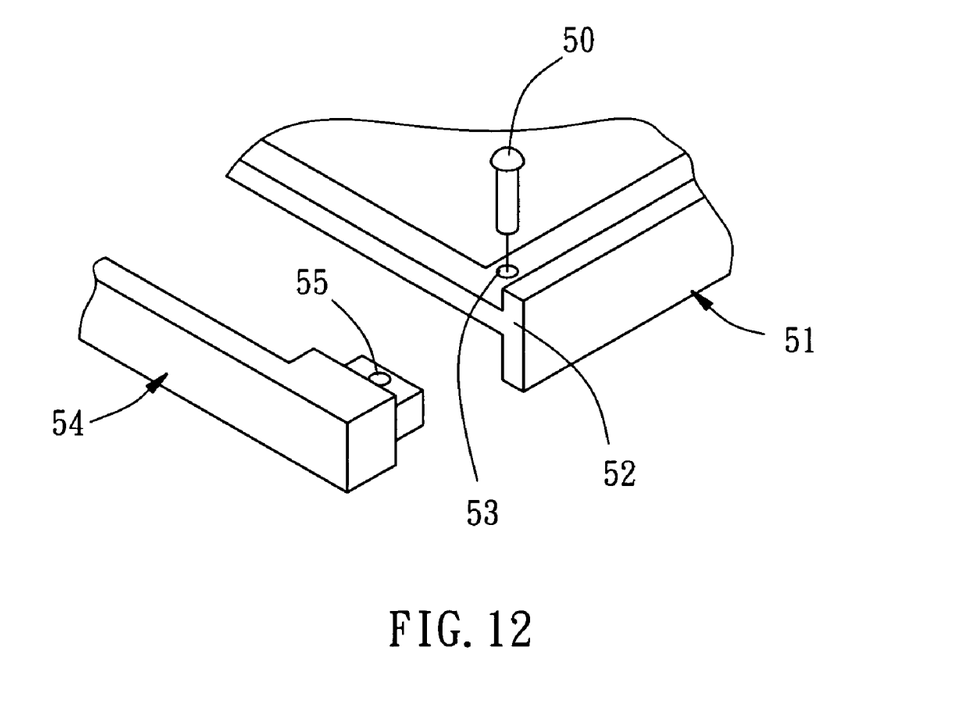
FIG. 12 is similar to FIG. 9, showing the fixing member to connect the barrier arm to the frame.

As shown in FIG. 12, the embodiment includes a fixing member 50. A frame member 51 has a through hole 53 adjacent to a second end 52 thereof. A barrier arm 54 has a fixing hole 55 aligned with the through hole 53. The fixing member is inserted into the through hole 53 and the fixing hole 55 to restrict the barrier arm 54.

The main scope of the present invention is the barrier arm to protect the flexible circuit from damage. The barrier arm can be an independent element to be bonded to the frame member by any known technique.

Figure 13:
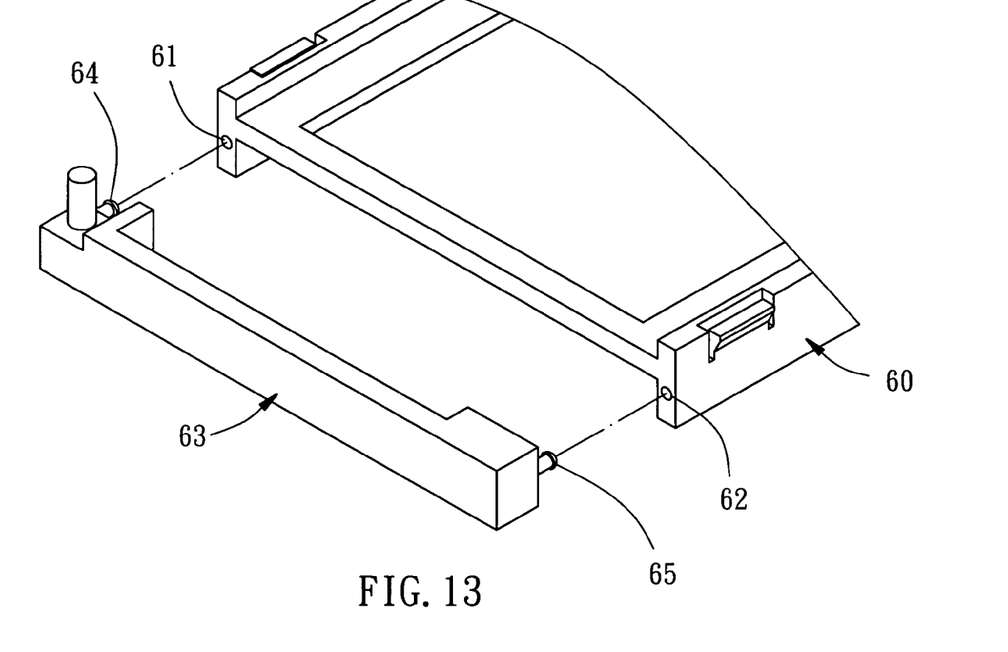
FIG. 13 is an exploded view in part of the present invention, showing the fixing pins mated with the through holes of the frame.

As shown in FIG. 13, a frame 60 has a first connecting portion 61 and a second connecting portion 62, both of which are through holes. A barrier arm 63 has a first bonding portion 64 and a second bonding portion 65, both of which are fixing pins, to be engaged with the connecting portions 61 and 62 respectively for connection of the barrier arm 63 and the frame member 60.

Figure 14:
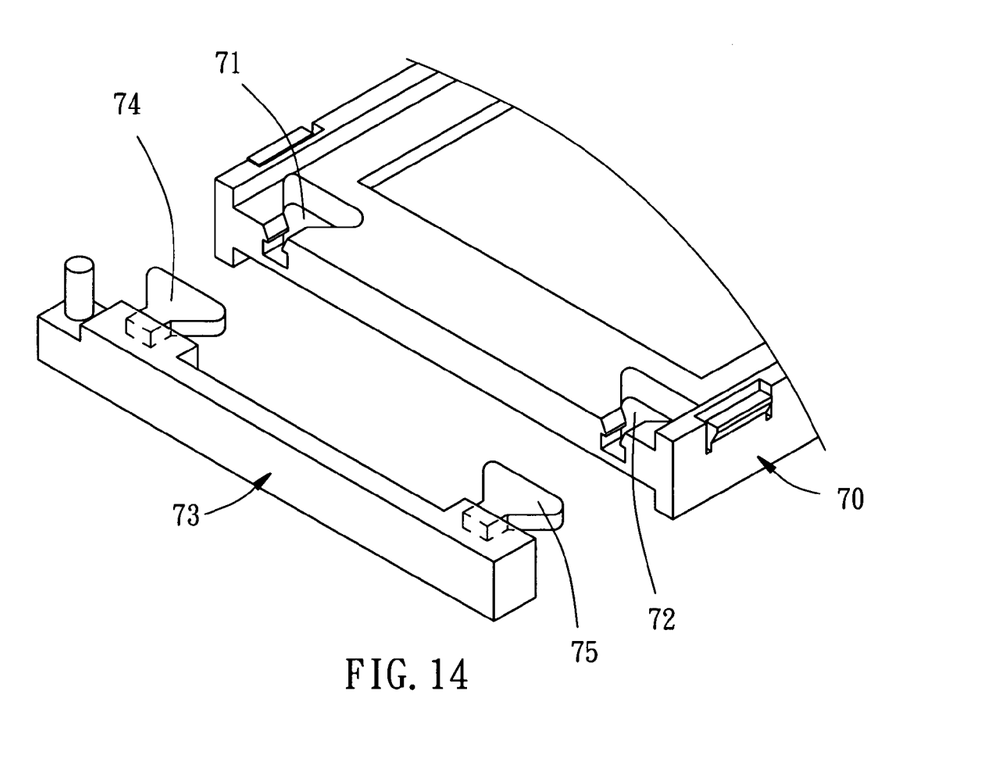
FIG. 14 is similar to FIG. 13, showing the lock blocks mated with the lock slot of the frame.

As shown in FIG. 14, a frame member 70 has a first connecting portion 71 and a second connecting portion 72, both of which are lock slots. A barrier arm 73 has a first bonding portion 74 and a second bonding portion 75, both of which are lock blocks, to be engaged with the connecting portions 71 and 72 respectively for connection of the barrier arm 73 and the frame member 70.

Figure 15:
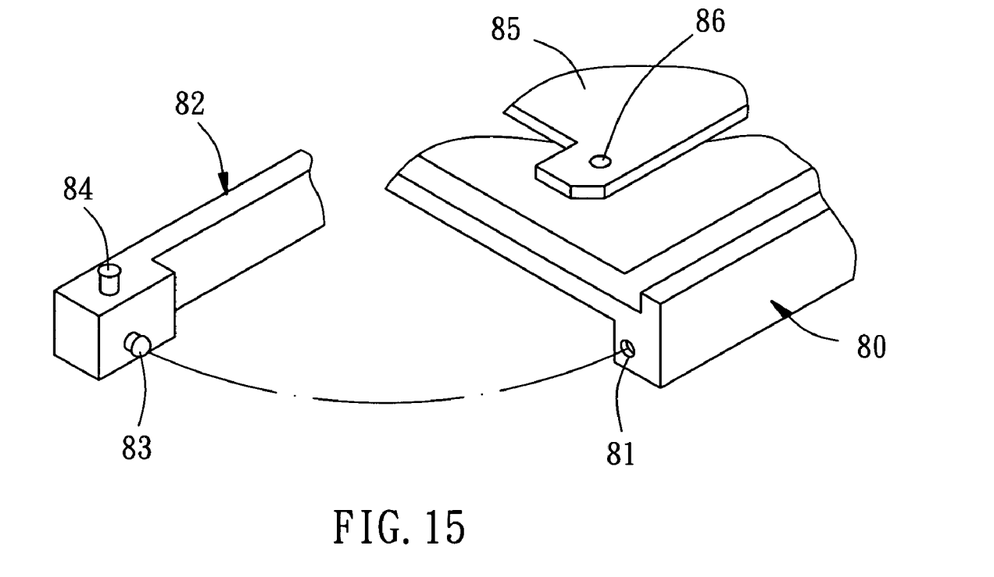
FIG. 15 is similar to FIG. 9, showing the barrier arm bonded to both of the frame and the circuit board.

In conclusion, FIG. 5 to FIG. 8 show the embodiments having the barrier arms bonded to the flexible circuit boards, and FIG. 9 to FIG. 14 show the embodiments having the barrier arms being independent elements to be bonded to the frame member. FIG. 15 shows an embodiment having the barrier arm bonded to the frame member and all the alternated structures described are applied in the embodiment also. The embodiment has a frame 80 with a first through hole 81. A barrier arm 82 has a first fixing pin 83 and a second fixing pin 84. A circuit board 85 has a second through hole 86. The first fixing pin 83 is engaged with the first through hole 81 and the second fixing pin 84 is engaged with the second through hole 86.

Figure 16:
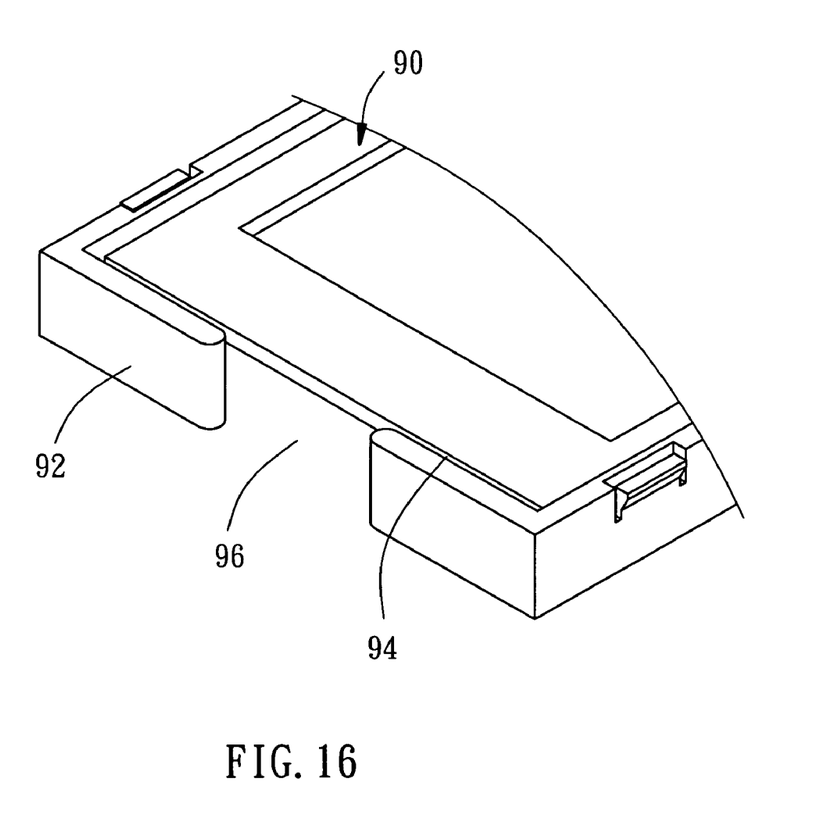
FIG. 16 is an exploded view in part of the present invention, showing the barrier arm and the frame being a single unit and the aperture on the barrier arm.

The present invention also can provide the barrier arm and the frame member being a single unit to enclose a close space therebetween. The circuit board with a narrow width can pass the space. The barrier arm still serves the function of protection of the flexible circuit board. As shown in FIG. 16, a frame member 90 and a barrier arm 91 are molded into a single unit to have a close space 94 therebetween. The barrier arm 92 has a gap 96 to enter a flexible circuit board into the space 94.

Although the invention has been explained in relation to its preferred embodiment, it is to be understood that many other possible modifications and variations can be made without departing from the spirit and scope of the invention as hereinafter claimed.

What is claimed is:

1. A frame of an optical display, which the optical display has a flexible circuit board, comprising:
   a frame member having a first surface,
   a barrier arm connected to the frame to have a space between the frame member and the barrier arm, the flexible circuit board bypasses the first surface and then passes through the space, and
   wherein the first surface of the frame member has a first end and a second end, the barrier arm having a second surface with a connecting end and a free end, the connecting end of the barrier arm being connected to the first end of the frame member and the free end of the barrier arm being suspended from the second end of the frame member, the space being formed between the first surface of the frame member and the second surface of the barrier arm.

2. The frame as defined in claim 1, wherein the frame member has a connecting portion adjacent to the second end thereof and the barrier arm has a bonding portion adjacent to the free end thereof to be engaged with the connecting portion.

3. The frame as defined in claim 2, wherein the connecting portion of the frame member is a through hole and the bonding portion of the barrier arm is a fixing pin to be inserted into the through hole.

4. The frame as defined in claim 3, wherein the fixing pine has a head at a distal end thereof extruded out of the through hole and the head has a diameter greater than a diameter of the through hole.

5. The frame as defined in claim 2, wherein the connecting portion of the frame member is a lock slot and the bonding portion of the barrier arm is a lock block to be engaged with the lock slot.

6. The frame as defined in claim 2, wherein the connecting portion of the frame member is a concave portion and the bonding portion of the barrier arm is a convex lock hook to be engaged with the concave portion.

7. The frame as defined in claim 1, further comprising a fixing member to be inserted into a through hole of the frame member adjacent to the second end thereof and a fixing hole of the barrier arm adjacent to the free end thereof to fix the fixing member in the through hole and the fixing hole.

8. The frame as defined in claim 1, wherein the optical display has a circuit board with at least a positioning portion and the barrier arm has at least a linking portion adjacent to the free end thereof to be connected to the positioning portion.

9. The frame as defined in claim 8, wherein the positioning portion of the circuit board is a through hole and the linking portion of the barrier arm is a fixing pin to be inserted into the through hole.

10. The frame as defined in claim 9, wherein the fixing pine has a head at a distal end thereof extruded out of the through hole and the head has a diameter greater than a diameter of the through hole.

11. The frame as defined in claim 10, wherein the fixing pin has a hook at the head to hook the circuit board.

12. The frame as defined in claim 8, wherein the frame member has a connecting portion adjacent to the second end thereof and the barrier arm has a bonding portion to be connected to the connecting portion.

13. The frame as defined in claim 12, wherein the connecting portion of the frame member is a through hole and the bonding portion of the barrier arm is a fixing pin to be inserted into the through hole.

14. The frame as defined in claim 13, wherein the fixing pine has a head at a distal end thereof extruded out of the through hole and the head has a diameter greater than a diameter of the through hole.

15. The frame as defined in claim 14, wherein the fixing pin has a hook at the head to hook the circuit board.

16. The frame as defined in claim 12, wherein the connecting portion of the frame member is a lock slot and the bonding portion of the barrier arm is a lock block to be engaged with the through hole.

17. The frame as defined in claim 12, wherein the connecting portion of the frame member is a concave lock portion and the bonding portion of the barrier arm is a convex lock hook to be engaged with the lock portion.

18. The frame as defined in claim 1, wherein the optical display has a circuit board with a through hole and the barrier arm has a fixing hole adjacent to the free end thereof and the frame has a fixing member to be inserted into both of the through hole of the circuit board and the fixing hole of the barrier arm.

19. A frame of an optical display, which the optical display has a flexible circuit board, comprising:
a frame member, and
a barrier arm connected to the frame to have a space between the frame member and the barrier arm, the flexible circuit board being received in the space
wherein the frame member has a first surface with a first end and a second end, the barrier arm having a second surface with a connecting end and a free end, the connecting end of the barrier arm being connected to the first end of the frame member and the free end of the barrier arm being suspended from the second end of the frame member, the space being formed between the first surface of the frame member and the second surface of the barrier arm.

* * * * *

UNITED STATES PATENT AND TRADEMARK OFFICE
CERTIFICATE OF CORRECTION

PATENT NO. : 7,586,751 B2 Page 1 of 1
APPLICATION NO. : 11/079100
DATED : September 8, 2009
INVENTOR(S) : Ho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1212 days.

Signed and Sealed this

Twenty-first Day of September, 2010

David J. Kappos
*Director of the United States Patent and Trademark Office*